United States Patent [19]

Cutler, Jr. et al.

[11] Patent Number: 5,794,120
[45] Date of Patent: Aug. 11, 1998

[54] METHOD AND APPARATUS FOR DEFAULT NODE OPERATION IN A MULTI-NODAL COMMUNICATION SYSTEM

[75] Inventors: Victor Hawes Cutler, Jr., Mesa; Jim E. Helm, Gilbert; Keith Andrew Olds, Mesa, all of Ariz.

[73] Assignee: Motorola, Inc., Schaumburg, Ill.

[21] Appl. No.: 506,306

[22] Filed: Jul. 24, 1995

[51] Int. Cl.$^6$ .................................................. H04B 7/185
[52] U.S. Cl. ........................................ 455/13.1; 455/13.1
[58] Field of Search ............................ 455/13.1, 13.2, 455/12.1, 33.1, 62, 67, 1, 13.4, 502, 503, 419, 427

[56] References Cited

U.S. PATENT DOCUMENTS

| | | | |
|---|---|---|---|
| 4,979,118 | 12/1990 | Kheradpir | 364/436 |
| 5,042,027 | 8/1991 | Takase et al. | 370/54 |
| 5,134,709 | 7/1992 | Bi et al. | 455/33.1 |
| 5,212,804 | 5/1993 | Choate | 455/33.1 |
| 5,268,694 | 12/1993 | Jan et al. | 342/354 |
| 5,327,572 | 7/1994 | Freeburg | 455/13.1 |
| 5,555,444 | 9/1996 | Diekelman et al. | 455/12.1 |
| 5,590,395 | 12/1996 | Diekelman | 455/13.1 |

*Primary Examiner*—Reinhard J. Eisenzopf
*Assistant Examiner*—Darnell R. Armstrong
*Attorney, Agent, or Firm*—Sherry J. Whitney

[57] ABSTRACT

In a communication system (10) having at least one control center (24) and multiple satellites (12), the satellites (12) operate according to tables (80), wherein each satellites table becomes obsolete at a known time referred to as the exhaustion time. The earliest exhaustion time of all satellites (12) is determined and sent to the satellites (12) in the form of a message or a time-tagged update table (150). When the earliest exhaustion time is reached without updating the satellite (12), the satellites (12) enter default operation at that earliest exhaustion time. The satellites (12) continue default operations until otherwise instructed by the control center (24).

15 Claims, 6 Drawing Sheets

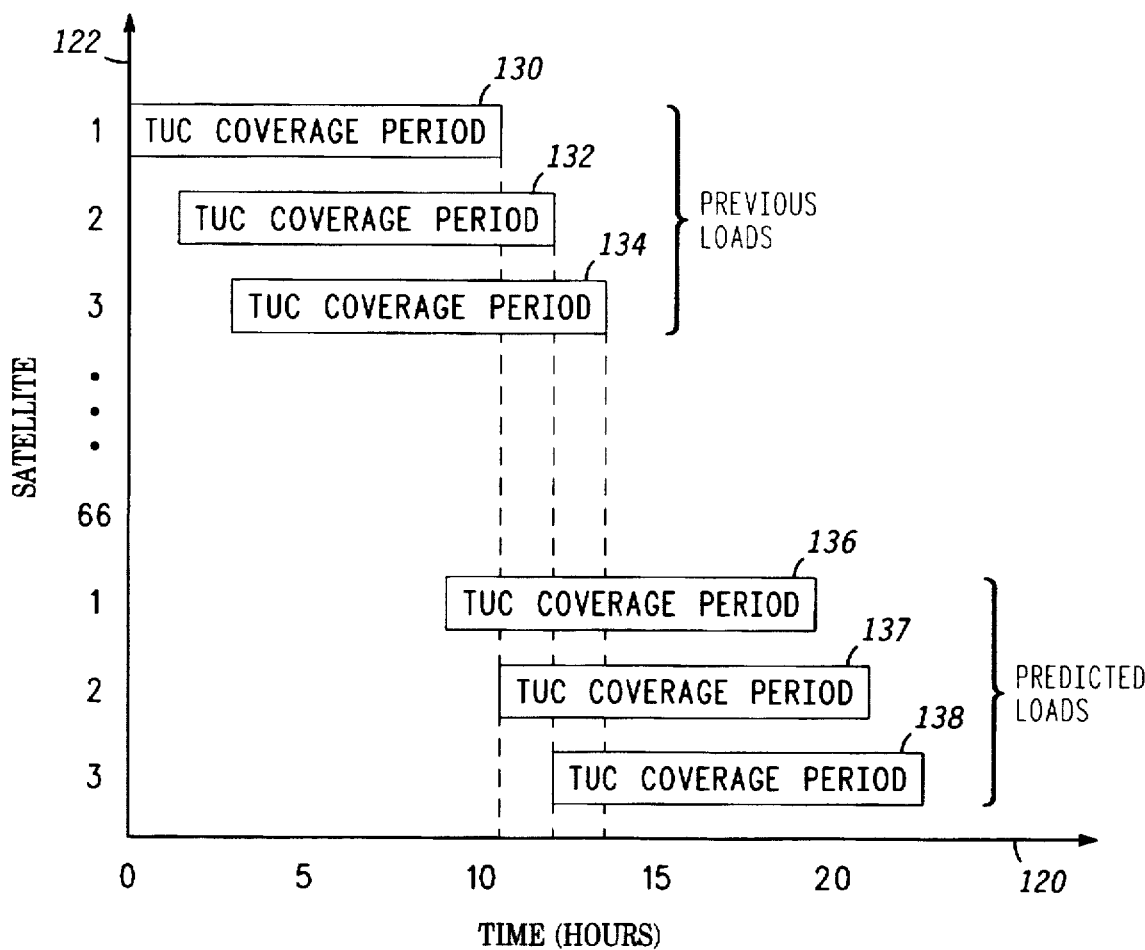

METHOD AND APPARATUS FOR DEFAULT NODE OPERATION IN A MULTI-NODAL COMMUNICATION SYSTEM

CROSS-REFERENCE TO RELATED APPLICATIONS

This application is related to co-pending U.S. patent application Ser. No. 08/150,702, filed on Nov. 10, 1993, entitled "Satellite Cellular Network Resource Management Method and Apparatus", which is assigned to the same assignee as the present application.

FIELD OF THE INVENTION

The present invention relates generally to default operation in a distributed communications system.

Background of the Invention

In a communication system having multiple nodes that route data packets between each other, each node must contain operational information that enables it to operate in conjunction with the other nodes of the system. Because system parameters (e.g., traffic load, available resources, equipment health) change from time to time, occasional updates of the node information are necessary for efficient operation of the system.

Desirably, updates to the node information occur before the node information becomes obsolete. A node may be operating on obsolete information when an update was not performed for whatever reason. A node operating with obsolete information may cause inefficient operation, or worse, disruption to system operations.

In prior art systems, node updates are performed by generating node information by a control center and sending the node information to the nodes. Generation of the node information is dependent on telemetry from the nodes that indicates the nodes' status. Planned node updates may be performed periodically to make certain that the node information does not become obsolete. Although planned node updates should be able to ensure that the node is always operating with current information, a planned node update may occasionally not be possible. In such a situation, the node information may become obsolete before the next node update is possible.

Occasional updates may also be required where an unforeseen event occurs, such as unusually heavy traffic load or an equipment failure, for example. When a node detects such an unforeseen condition, the node must report the failure to a control center, the control center must generate new information for all affected nodes, and the control center must distribute the new information to the affected nodes. Thus, a period of time elapses during which the affected nodes operate with obsolete information.

What are needed are a method and apparatus for efficient updates of node information. Further needed are a method and apparatus for default node operation when updates are not possible, where the default node operation allows the communication system to operate without major system disruption.

BRIEF DESCRIPTION OF THE DRAWINGS

FIG. 6 illustrates a table update process for multiple nodes in accordance with a preferred embodiment of the present invention;

FIG. 7 illustrates an exemplary exhaustion time table in accordance with a preferred embodiment of the present invention;

DETAILED DESCRIPTION OF THE DRAWINGS

The present invention provides a method and apparatus for efficiently updating node information. Further provided are a method and apparatus for default node operation when updates are not possible, where the default node operation allows the communication system to operate without major system disruption.

In summary, the method and apparatus of the present invention involve generating current and default node information and sending the current and default node information to the nodes. When any node's current information becomes obsolete, all nodes of the system begin operating according to their default information. The method and apparatus of the present invention provide a way of synchronizing use of the default information among the nodes by utilizing "exhaustion times" which are stored in the nodes. Use of these exhaustion times minimizes disruption to the communication system due to a planned or unforeseen failure to update one or more nodes' operational information.

Figure 1:
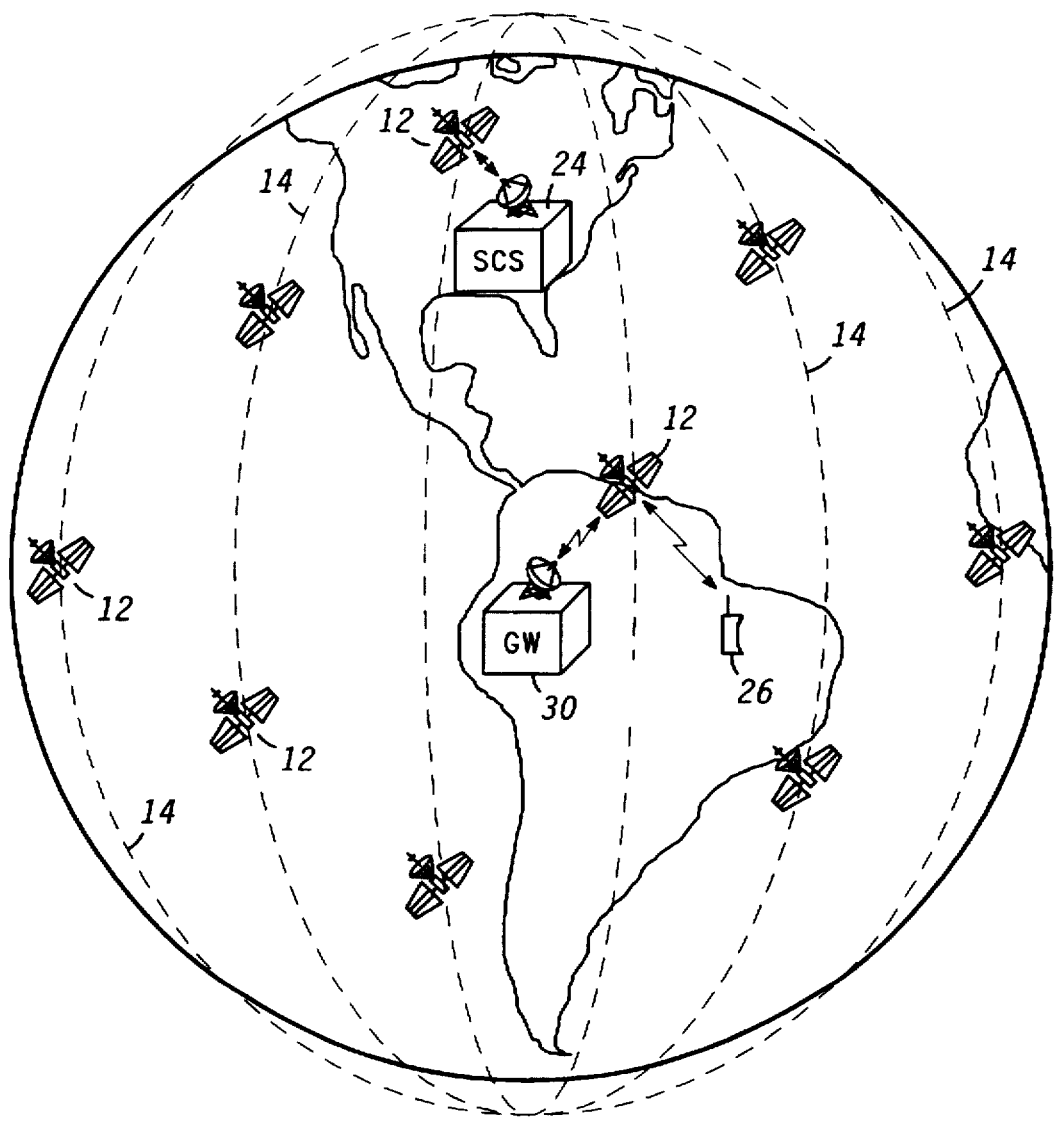
FIG. 1 illustrates a multi-nodal communication system in accordance with a preferred embodiment of the present invention.

FIG. 1 illustrates a multi-nodal communication system 10 in accordance with a preferred embodiment of the present invention. Although the preferred embodiment of the present invention is described as a satellite communication network having radio frequency (RF) communication links, the method and apparatus of the present invention may be utilized in a ground-based communication system as would be obvious to one of skill in the art based on the description. Additionally, communication links between system nodes may utilize any type of data transmissions (e.g., electrical, radio, or optical transmissions).

Communication system 10 is dispersed over, and surrounds the earth through the use of orbiting satellites 12. Satellites 12 occupy orbits 14 that may be low-earth orbits, medium-earth orbits, geosynchronous orbits, or a combination thereof. In the example shown, communications system 10 uses six polar orbital planes, with each orbital plane holding eleven satellites 12 for a total of sixty-six satellites 12.

However, sixty-six satellites 12 are not essential, and more or fewer satellites 12, or more or fewer orbital planes, or combinations of orbiting and geosynchronous satellites, may be used. For clarity, FIG. 1 illustrates only a few of satellites 12.

Satellites 12 operate as routing nodes for communication system 10, and communicate with terrestrial equipment which may be any number of radio communication Subscriber Units 26, Gateways 30, System Control Station 24, and possibly other communication devices (not shown). Satellites 12 also desirably communicate with other satellites 12 over "cross links".

Each satellite 12 desirably has at least one resident operational table which the satellite 12 updates using information received from System Control Station 24. Functionality of satellites 12 and update of a satellite's operation information (or "node information") is described in detail in conjunction with FIGS. 2–4 and 8.

A Subscriber Unit 26 (SU) may be, for example, a hand-held, portable cellular telephone adapted to transmit data to and/or receive data from satellites 12. An SU 26 may also be a facsimile device, pager, data terminal or any other type of communication device. Hard-wired telephony units (not shown) may also serve as communication terminals in communication system 10. These telephony units may communicate with the satellite network using intermediate Gateways 30.

A Gateway 30 (GW) is an equipment facility, typically ground-based, that is capable of interfacing satellites 12 with ground-based equipment such as, for example, a public switched telephone network (PSTN) (not shown). GW 30 may communicate directly with satellites 12, or may communicate via remote or co-located ground stations (not shown).

A System Control Station 24 (SCS) is a control facility, typically ground-based, which controls some operations of communication system 10. SCS 24 may communicate directly with satellites 12, or may communicate via remote or co-located ground stations (not shown).

In a preferred embodiment, SCS 24 creates table update commands (TUCs) and sends them to satellites 12. Satellites 12 use the TUCs to modify their resident operational tables. SCS 24 also desirably receives telemetry information from satellites 12 (e.g., notification of a failed link, power availability) and creates and sends new TUCs to accommodate system changes, when necessary. In an alternate embodiment, SCS 24 may send entire operational tables to satellites 12 to accommodate system changes, rather than sending TUCs which are used to modify existing operational tables. The concept of TUCs being used to update satellite operational tables is described in detail in conjunction with FIGS. 3–5. Functionality of SCS 24 in a preferred embodiment is described in detail in conjunction with FIG. 8.

Only one of SCS 24, GW 30, and SU 26 are shown in FIG. 1 for clarity and ease of understanding. Those of skill in the art will understand based on the description that additional system facilities may be desirable, depending upon the requirements of the communication system.

Figures 2, 3:
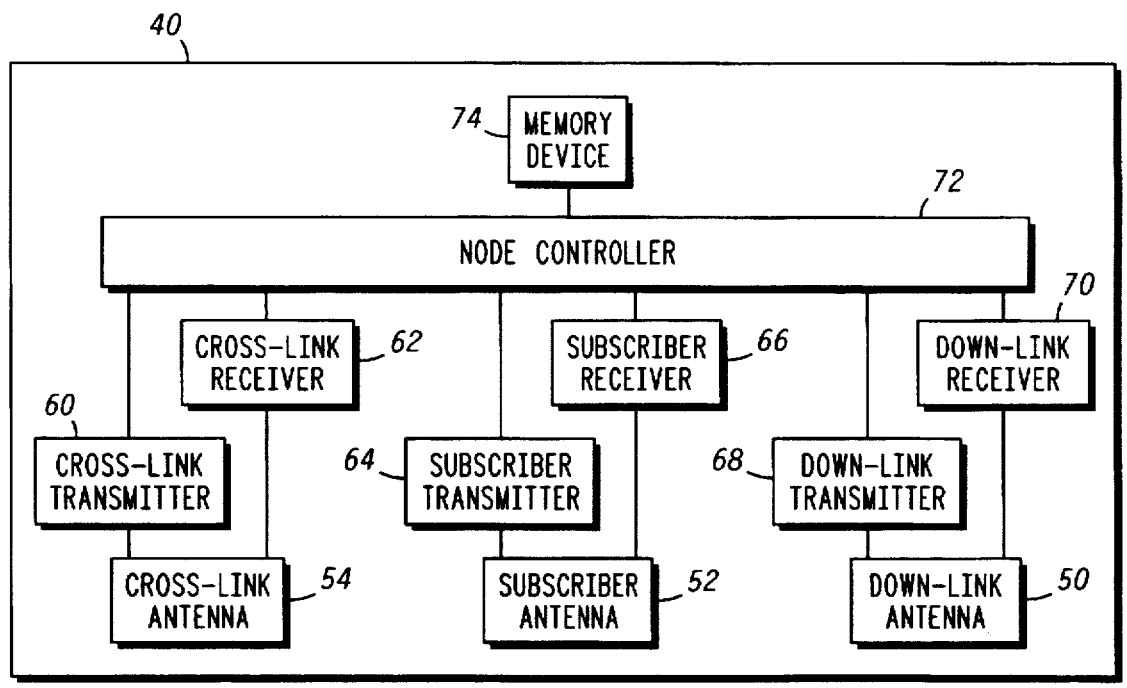
FIG. 2 illustrates a communication node in accordance with a preferred embodiment of the present invention.
FIG. 3 illustrates an execution table and a dynamic timed-command table in accordance with a preferred embodiment of the present invention.

FIG. 2 illustrates a communication node 40 in accordance with a preferred embodiment of the present invention. Communication node 40 may be, for example, a satellite 12 as shown in FIG. 1. However, it would be obvious to one of skill in the art based on the description that other communication devices (e.g., ground-based routing devices) using other modes of data transmission (e.g., optical or electrical transmissions) may also be employed as a communication node.

Node 40 desirably includes one or more cross-link antennas 54, down-link antennas 50, and subscriber antennas 52. Although only one each of cross link antenna 54, down-link antenna 50, and subscriber antenna 52 are shown in FIG. 2, more than one of any of them may reside on-board node 40, as would be obvious to one of skill in the art based on the description. It would be obvious to one of skill in the art based on the description that if the node is a device other than a satellite, the links supported by antennas 50, 52, 54 could instead be hard-wired or optical links, for example. Accordingly, the hardware used to support those links would be appropriate for the transmission method.

Cross-link antenna 54 is coupled to cross-link transmitter 60 and cross-link receiver 62, and is desirably used to communicate with neighboring nodes (not shown). In a preferred embodiment, node 40 has a cross-link antenna 54 for each neighboring node with which node 40 communicates. Thus, for example, if node 40 communicates with four neighboring nodes, at least four cross-link antennas 54 would exist on-board node 40.

Subscriber antenna 52 is coupled to subscriber transmitter 64 and subscriber receiver 66, and is desirably used to communicate with SUs 26 (FIG. 1). In a commercial system, revenue-bearing SU "mission data" is transmitted and received using subscriber antenna 52. In a preferred embodiment, subscriber antenna 52 is a cellular antenna. Subscriber antenna 52 projects one or more "cells" onto the surface of the earth which provide a conduit for communication between the multiple SUs 26 (FIG. 1) and the node 40. Each cell may provide multiple communication channels that do not interfere with each other by using different time slots and/or frequency subbands.

Down-link antenna 50 is coupled to down-link transmitter 68 and down-link receiver 70, and is desirably used to communicate with SCS 24 (FIG. 1) and/or GW 30 (FIG. 1). Desirably, telemetry, TUCs, and other system operations data are transmitted and received using down-link antenna 50.

In a preferred embodiment, transmitters 60, 64, 68 and receivers 62, 66, 70 are all coupled to node controller 72, which is, in turn, coupled to memory device 74. In an alternate embodiment, multiple controllers and memory devices (not shown) may exist on-board node 40, each providing a distributed-controller function. However, for ease of description, only one node controller 72 is shown, and portions of the method of the present invention that pertain to a node 40 are described as being executed by the single node controller 72. It would be obvious to one of skill in the art based on the description, however, that portions of the method of the present invention that pertain to a node 40 may be carried out by distributed controllers (not shown).

Node 40 also desirably includes an energy-generating device (not shown) to provide energy to the equipment on-board node 40. For example, if node 40 is a satellite, an energy-generating device may consist of solar panels coupled to batteries.

It would be obvious to one of skill in the art based on the description that if a system node were not a satellite, an energy supply may be provided by other energy-generating equipment.

Node controller 72 controls real-time operation of node 40, including data routing functions, channel resource control, and other operations of cross-link antenna 54, subscriber antenna 52 and down-link antenna 50. Among other things, node controller 72 controls reuse of communication channels in various cells projected toward the earth by subscriber antenna 52. Although the particular way that reuse control is performed by the communication system is not critical to the present invention, reuse control is described herein and used as an example to illustrate the applicability of the present invention. As would be obvious to one of skill in the art based on the description, other examples could have been used to illustrate the applicability of the present invention, including routing or channel assignment, for example.

Each node contains channel reuse tables (FIG. 3) that contain information that describes for each cell the time slots and frequency subbands (defining communication channels) which that cell may use to support traffic at a particular time. A channel reuse table desirably contains a cell identification number ("cell ID"), and one or more "reuse units" for each cell ID. A cell ID identifies one of the cells supported by the satellite. A reuse unit is one time slot and frequency subband that is allocated to the cell ID. One or more reuse units will be assigned to each cell. The reuse units are chosen so that the time slots and frequency subbands do not interfere with channels in other nearby cells from the same satellite or from other nearby satellites. A satellite may use all the reuse units for a given cell ID simultaneously if the traffic load so requires. The information contained within the channel reuse tables (as well as other tables) is generated by the SCS 24 (FIG. 1) and sent to the nodes. This information must be generated based on global knowledge of the reuse allocations to avoid interference from reuse units on different satellites 12 (FIG. 1). The entries in the reuse tables must be regularly updated to avoid interference as the relative positions of the satellites change.

FIG. 3 illustrates an execution table 80 and a dynamic timed-command table 90 in accordance with a preferred embodiment of the present invention. These tables desirably reside in a memory device that is accessible to the node. For exemplary purposes, the execution, static, and dynamic tables shown in FIG. 3 correspond to channel reuse tables. As explained previously, the method and apparatus of the present invention may apply equally well to tables that are used for other node functions.

Execution table 80 contains information the node requires to operate. An execution table may be used for a wide range of node operations, including routing and channel reuse. Execution table 80 is a channel reuse table and has a cell ID column 82 and a reuse unit column 84. Cell ID column 82 contains ID numbers for the cells supported by the node. Reuse unit column 84 contains one or more reuse units for each cell ID number.

Timed-command table 90 contains TUCs that have been generated by SCS 24 (FIG. 1) and sent to the node. Timed-command table 90 contains information relevant to modifying a particular execution table. Because timed-command table 90 is used to modify the channel reuse execution table 80, timed-command table 90 contains TUCs that apply to channel reuse.

Timed-command table 90 is desirably a first-in, first-out (FIFO) queue. When new TUCs are received by the node, the new TUCs are appended to the end of timed-command table 90.

Timed-command table 90 has day column 92, time column 94, cell ID column 96, and reuse unit column 98. Day column 92 and time column 94 indicate the system time when the reuse units 84 in the execution table 80 for a particular cell ID 82 should be modified to be the reuse units 98 in the timed-command table 90. System time is maintained on-board the node. Thus, for example, when the system time reaches day 365, time 23:00:03, the reuse units 84 in the execution table 80 for cell ID #2 are replaced with the reuse units 98 in timed-command table 90. After that time, cell ID #2 in the execution table 80 will have reuse units "106" and "212".

It would be obvious to one of skill in the art based on the description that day column 92 and time column 94 may be modified to contain any other indicia of a time when the TUC should be used to modify the execution table 80.

In a preferred embodiment, the TUCs in the timed-command table 90 are used to modify the execution table 80 and the default table 100 as described below. In an alternate embodiment, SCS 24 (FIG. 1) sends an entire execution table 80 and default table 100 and does not use TUCs to modify these tables. The advantage to sending TUCs is that a single entry of a table may be modified without the need to replace the entire table. Thus, system bandwidth is conserved by not sending an entire table. It would be obvious to one of skill in the art that sending TUCs is a preferred embodiment of the present invention but is not necessary to achieve the advantages of the present invention.

Occasionally, timed-command table 90 may run out of TUCs. This may occur, for example, when SCS 24 (FIG. 1) was unable to generate or send new TUCs to the node. When the channel reuse requirements change rapidly due, for example, to movement of the node (e.g., orbit of a satellite) or varying traffic demands within the cells, the channel reuse information contained within the execution table 80 may rapidly become obsolete.

Additionally, reuse unit allocations for the cells of a particular satellite depend on the reuse allocations for the cells of the other satellites. When other nearby satellites continue to modify their own reuse tables, conditions of interference are likely to occur. To avoid such conditions, the method and apparatus of the present invention have default execution tables accessible to each node.

Figures 4, 5:
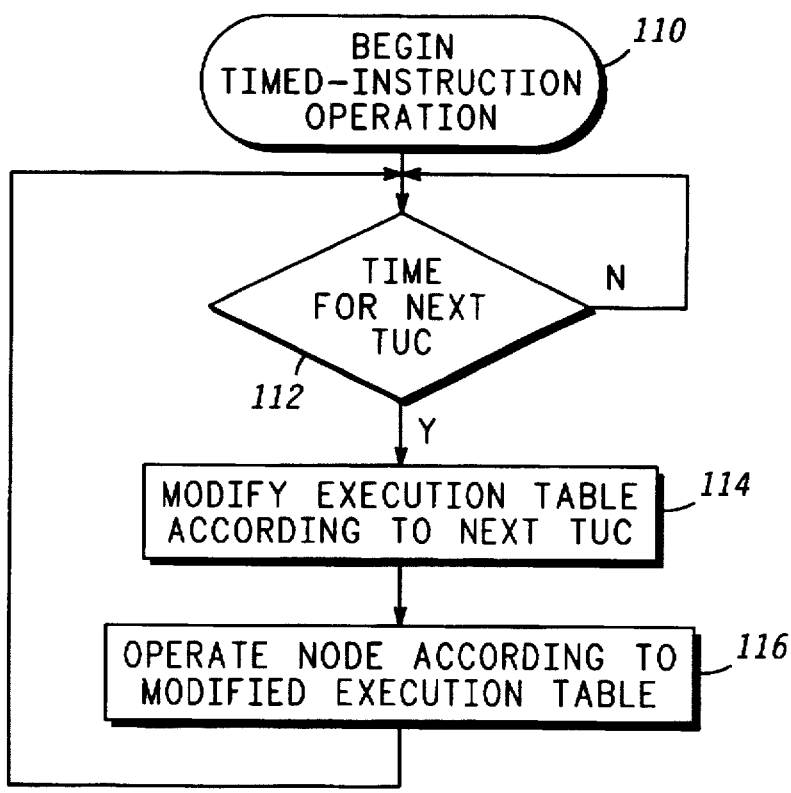
FIG. 4 illustrates a static default table in accordance with a preferred embodiment of the present invention.
FIG. 5 illustrates a method for a communication node to operate according to the timed-command table in accordance with a preferred embodiment of the present invention.

FIG. 4 illustrates a static default table 100 in accordance with a preferred embodiment of the present invention. The exemplary default table 100 shown in FIG. 4 is used for channel reuse and contains cell ID column 102 and reuse unit column 104. For each cell ID 102, default reuse units 104 are allocated. At a time when any node begins operating using obsolete information, the nodes of the system should begin using the entries in default table 100 rather than the entries in execution table 80 to control channel reuse. The entries of default table 100 are determined to produce an acceptable level of reuse. Although operation in accordance with default table 100 is not as efficient as operation in accordance with the dynamic table 80 (FIG. 3), the system may function acceptably by using default table 100. Default tables are generated for every node so that if all nodes begin using their default tables simultaneously, interference between cells of nearby satellites is avoided. Entering this default operation is described in detail in conjunction with FIGS. 8–9.

FIG. 5 illustrates a method for a communication node to operate according to the timed-command table in accordance with a preferred embodiment of the present invention. The method of FIG. 5 will be described in conjunction with FIGS. 3–4

The method begins in step 110 when the node determines in step 112 whether or not it is time for the next TUC in timed-command table 90 to be used to modify an entry in the execution table 80. This is done by comparing the system time with the day 92 and time 94 of the next TUC. When it is not time to utilize the next TUC, the procedure iterates as shown in FIG. 5.

When it is time to utilize the next TUC, step 114 modifies the appropriate entry in the execution table 80 according to the next TUC. In step 116, the node continues to operate according to the modified execution table. The procedure then iterates as shown in FIG. 5.

Node updates (e.g., sending TUCs to a satellite) may occur by "line-of-sight" update between a control center and the node, or by routing update information through the communication system. In a preferred embodiment, line-of-sight updates are performed because less system bandwidth is consumed. By routing update information through the system, valuable system bandwidth is used.

A line-of-sight update occurs between SCS 24 (FIG. 1) and a satellite 12 when the satellite 12 is "visible" to SCS 24 (i.e., the satellite 12 and SCS 24 are in a geometrical relationship that permits direct radio communication). The period of time that a satellite is visible to the control center is referred to herein as a "visibility interval".

The TUCs uploaded to a satellite 12 during a visibility interval will desirably last the satellite 12 until the next time the satellite 12 will be visible to SCS 24. Otherwise, the satellite's execution table (e.g., execution table 80, FIG. 3) may become obsolete.

The information contained within TUCs is based on future predictions of system conditions (e.g., satellite locations, traffic load). Because predictions cannot perfectly model future conditions ad infinitum, a prediction will only be considered valid for a certain future period of time. Therefore, SCS 24 desirably will only generate new TUCs for the future period of time that the information is likely to be valid.

In a preferred embodiment, the future period should exceed the maximum time between visibility intervals. Using spherical geometry and orbit dynamics calculations, it is possible to accurately predict the maximum time between visibility intervals for every satellite of a constellation. If, for example, the maximum time between visibility intervals is seven hours, the future period during which SCS 24 generates TUCs should exceed seven hours. The future period length depends on the length of time SCS 24 can predict future conditions with enough accuracy to generate valid information for the satellite 12.

Assume, for example, that SCS 24 can generate relatively accurate information for a particular satellite 12 for a 10-hour future period. The 10-hour period desirably begins when SCS 24 will perform its line of sight load with that satellite 12. After the line of sight load is performed, the TUCs will cover the next 10 hours. With a maximum time between visibility intervals of seven hours, the satellite 12 should again be visible to SCS 24 before expiration of the 10 hour period. At the next visibility time, another TUC upload will desirably occur that will cover the next 10-hour period, and so on. Thus, the information in the satellite execution table 80 (FIG. 3) should theoretically never become obsolete.

As would be obvious to one of skill in the art based on the description, the 7-hour maximum time between visibility intervals and the 10-hour period the TUCs cover are used for exemplary purposes only. Actual times will depend on the communication system and may significantly vary from these exemplary values.

Occasionally, a line-of-sight load may not be possible for whatever reason. For example, an atmospheric anomaly may prevent SCS 24 from sending new TUCs to a satellite 12 at a time when the satellite 12 would otherwise be visible to SCS 24.

When the satellite 12 does not receive new TUCs, the execution table 80 (FIG. 3) may become obsolete before the next visibility interval. As previously explained, if one satellite's execution table 80 becomes obsolete, interference conditions may result with the other satellites 12 of the communication system 10.

The method and apparatus of the present invention eliminates the possibility of interference conditions by placing all satellites 12 into a default mode when any satellite's execution table 80 becomes obsolete. As explained in more detail below, each satellite 12 begins using a default table 100 rather than its obsolete execution table 80 at the time of obsolescence of any satellite.

Each satellite's visibility intervals are generally different from the other satellite's visibility intervals. Thus, each satellite 12 is sent TUCs at different times. Because each satellite is sent TUCs at different times, the periods of time each satellite's TUCs cover are not concurrent. Because these periods are not concurrent, the times that each satellite's information will become obsolete are also not concurrent.

The period of time that a satellite's TUCs cover is referred to herein as a "TUC coverage period". The time that satellite information becomes obsolete in a particular satellite is referred to herein as the "exhaustion time", which occurs at the end of a TUC coverage period. In the communication system described in conjunction with FIG. 1 which includes sixty-six satellites, as many as sixty-six different exhaustion times may exist for the satellites.

Normally, each satellite has a different exhaustion time. Thus, at least one satellite must have an exhaustion time that is earlier than all other exhaustion times. This earliest exhaustion time is referred to herein as the "default time". If the satellite with the earliest exhaustion time is not updated before its exhaustion time, the system knows to enter default operations.

FIG. 6 illustrates a table update process for multiple nodes in accordance with a preferred embodiment of the present invention. FIG. 6 shows time axis 120 and satellite axis 122. Time axis 120 represents time in hours beginning at some arbitrary start time (time=0). As would be obvious to one of skill in the art based on the description, the number of satellites and the times shown are for purposes of example only. For ease of illustration, FIG. 6 shows satellites 1–66 being loaded sequentially. However, as would be obvious to one of skill in the art based on the description, satellites 1–66 would be loaded in the order they become visible to SCS 24 (FIG. 1).

For the first occurrence of each satellite along satellite axis 122, the horizontal bars 130–134 represent the TUC coverage periods for TUC loads that have already occurred. For example, the TUC coverage period for satellite 1 begins at time=0 and ends at time=10. Desirably, time=0 would begin after the visibility interval during which the TUCs were loaded for the TUC coverage period. Time=10 is the exhaustion time for satellite 1.

Horizontal bars 136–138 represent predictions of TUC coverage periods for TUC loads that have not yet occurred. These predictions are shown on FIG. 6 to facilitate explanation of a preferred embodiment of the present invention described in conjunction with FIG. 8. After satellites 1–66 have been loaded a first time as indicated by horizontal bars 130–134, the procedure should iterate, as illustrated by the prediction of satellite 1 being reloaded at time=9. To avoid operating with an obsolete execution table, satellite 1 must be reloaded before the exhaustion time of the previous load. If satellite 1 is successfully reloaded, this condition will be met for satellite 1. If satellite 1 is not successfully reloaded, satellite 1 will soon be operating with an obsolete execution table. At the time when the execution table of satellite 1 becomes obsolete, default operation for all satellites of the system should be initiated. The satellites know to begin using their default tables by referring to a "default time" stored within the satellites. The default time is updated on-board the satellite by using an "exhaustion time table". This process is described in more detail in conjunction with FIGS. 8–9.

FIG. 7 illustrates an exemplary default time update table 150 ("update table") in accordance with a preferred embodiment of the present invention. An update table 150 is resident on-board each satellite 12. Update table 150 has an update time column 153 and a new default time column 154.

In a preferred embodiment, new default time column 154 contains predictions of the exhaustion times for the next TUC loads of other satellite in the communication system (e.g., exhaustion times for predicted loads 136–138, FIG. 6). When the system time reaches the next time in the update time column 153, the corresponding new default time 154 is used to replace the default time stored in the satellite.

If the SCS 24 is unable to perform a TUC load for a particular satellite as predicted, the SCS 24 will send a message to the satellites throughout the system that will cause the satellites to backdate their default time to the previous exhaustion time of the unsuccessfully loaded satellite. This procedure is described in more detail in conjunction with FIG. 8.

In an alternate embodiment, after SCS 24 has successfully loaded a node, SCS 24 sends a message throughout the communication system that tells each node to change its default time to reflect the earliest exhaustion time of the satellites. Thus, SCS 24 would not need to send an update table 150 to the nodes. The tradeoff of this alternate embodiment is that, although update tables need not be sent to satellites, routing the update messages to each satellite after every load would consume more system resources that could be better utilized for other purposes.

The exemplary update table 150 shown in FIG. 7 represents the preferred embodiment of the invention (i.e., new default time column 154 contains predictions of the exhaustion times for the next TUC loads). Update table 150 shows a predicted exhaustion time for the next TUC load of satellite 1 at time=19:00. When the system time equals the corresponding update time in column 153 (i.e., when time= 9:00), the exhaustion time in column 154 will replace the satellite's default time.

If SCS 24 cannot successfully reload satellite 1 at time=9, SCS 24 will send a message throughout the communication system to backdate each satellite's default time to the exhaustion time of the last successful TUC load of satellite 1 (i.e., at time=10).

As long as the system time never reaches the default time, default operation will not occur. During normal operations, the default time should stay ahead of the system time. However, if the system time does reach the default time, all satellites will enter default operation simultaneously. This procedure is described in more detail in conjunction with FIGS. 8–9.

Figure 8:
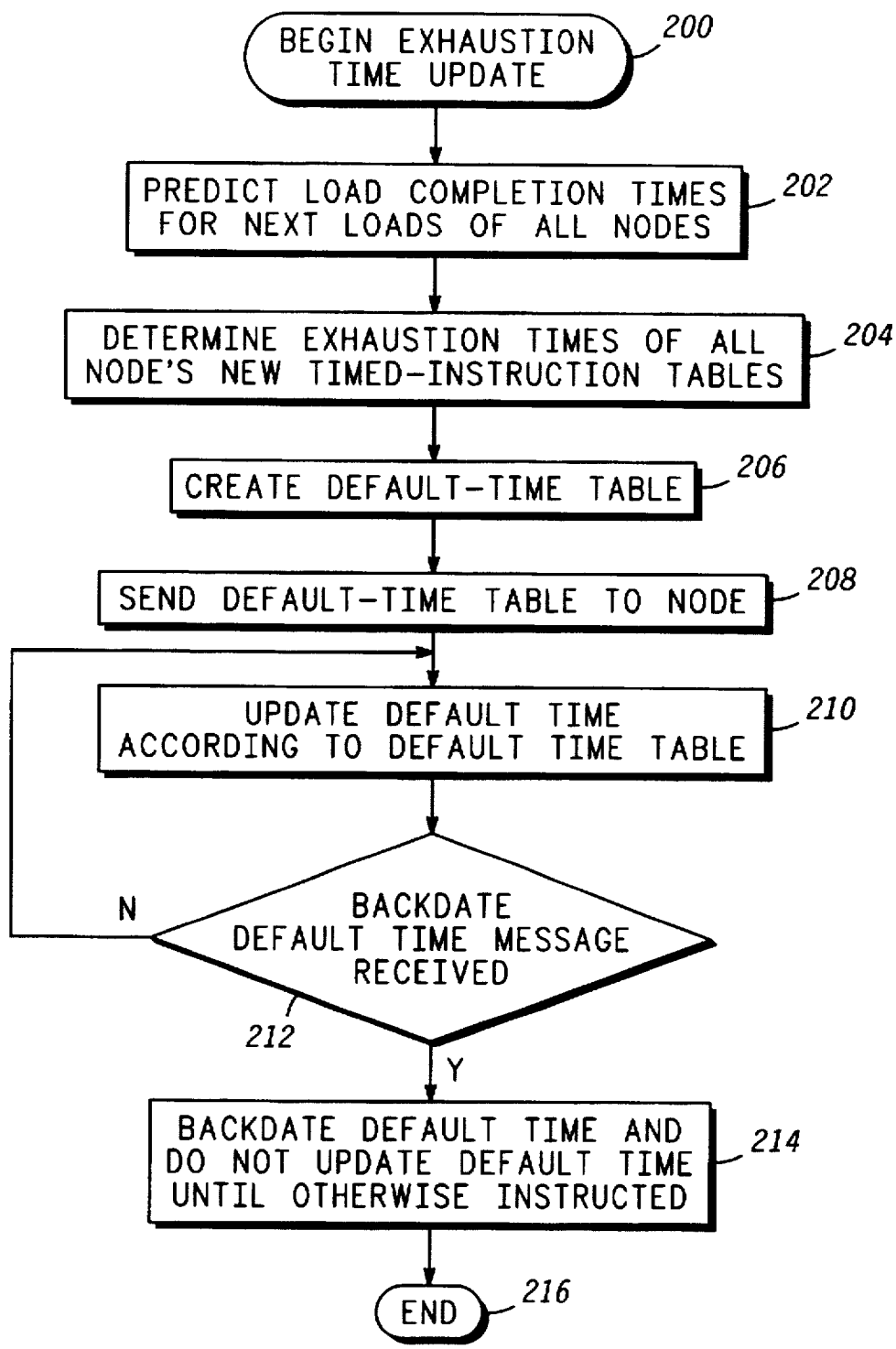
FIG. 8 illustrates a method for a communication node to update a timed-command table and an exhaustion time table in accordance with a preferred embodiment of the present invention.

FIG. 8 illustrates a method for a communication node to update a timed-command table and a default time table in accordance with a preferred embodiment of the present invention. The method is desirably performed by a control center (e.g., SCS 24, FIG. 1).

The method begins in step 200 by performing the step 202 of predicting load completion times for the next loads of all nodes. Prediction of load completion times may be done by first determining (e.g., using spherical geometry techniques) the next visibility intervals for each of the nodes. Then, based on the acquisition time and the amount of data to be loaded, the load completion time is then predicted for each node.

In step 204, exhaustion times of all nodes' new TUCs are determined. An exhaustion time for a particular node is desirably the execution time of the last new TUC.

From the exhaustion times determined in step 204, an update table (e.g., update table 150, FIG. 7) is created in step 206. In a preferred embodiment, an update table 150 is created for a particular node such that the update table 150 contains entries spanning the time from the current load to the next planned load of the particular node. Thus, the update table 150 for each node is different (although different nodes' update tables may contain many of the same entries).

Step 208 sends the update table 150 to the node. The update table 150 may be sent directly to a node during a visibility interval, or may be routed through the system to the node. The update table 150 is used to modify the default time that is stored in the node.

In step 210 the satellite updates its default time according to the update table 150. When the system time matches the next update time 153 in the update table 150, the satellite uses the new default time 154 to replace the default time.

A determination is made in step 212 as to whether a message to backdate the default time has been received by the satellite. A message to backdate the default time is sent to the satellites when a planned satellite load was unsuccessful. When a satellite load is unsuccessful, its exhaustion time does not change. Thus, the satellite's previous exhaustion time should be the default time. The message to backdate the default time contains the previous exhaustion time of the unsuccessfully loaded satellite.

When no message to backdate the default time has been received, the procedure iterates as shown in FIG. 8. When a message to backdate the default time has been received, the default time is backdated as described above in step 214. The default time is not updated until the satellite is otherwise instructed. The method then exits in step 216.

Figure 9:
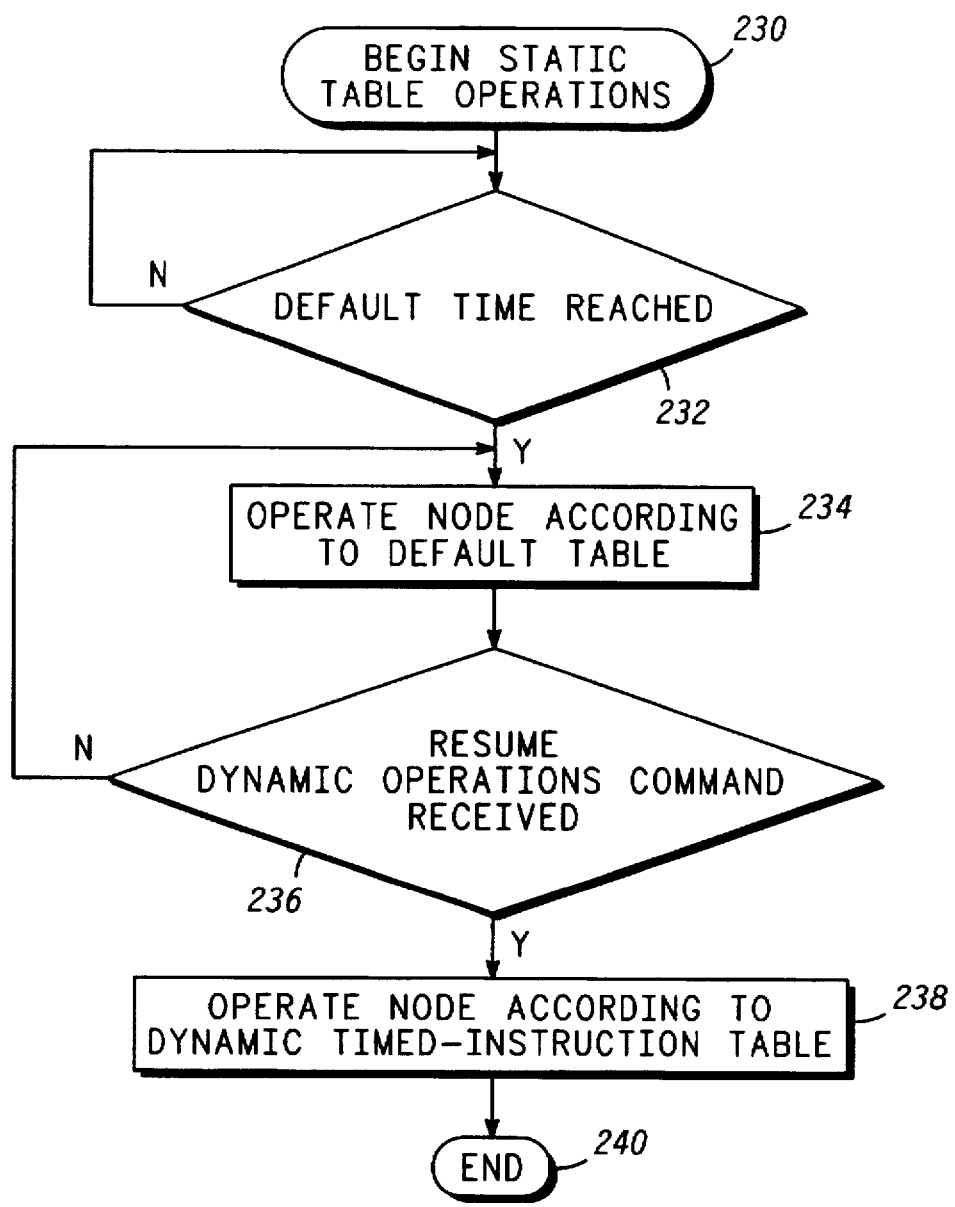
FIG. 9 illustrates a method for a communication node to modify operations when an exhaustion time is reached in accordance with a preferred embodiment of the present invention.

FIG. 9 illustrates a method for a communication node to modify operations when an exhaustion time is reached in accordance with a preferred embodiment of the present invention.

The method begins in step 230 by determining, in step 232 whether the default time has been reached. When the default time has not been reached, the method iterates as shown in FIG. 9. When the default time has been reached, step 234 initiates operation of the node according to the default table as described in conjunction with FIG. 4.

Next, step 236 determines whether a resume dynamic operations command has been received. In a preferred embodiment, a resume dynamic operations command is a time-tagged command so that all nodes may resume dynamic operations at the same system time. When no resume dynamic operations command has been received, the method iterates as shown in FIG. 9.

When a resume dynamic operations command has been received, step 238 initiates operation of the node according to the dynamic timed-instruction table as described in conjunction with FIG. 3. The procedure then exits in step 240.

In summary, a method and apparatus has been described for synchronizing default node operations in a multi-nodal communication system. The foregoing description of the specific embodiments will so fully reveal the general nature of the invention that others can, by applying current knowledge, readily modify or adapt for various applications such specific embodiments without departing from the generic concept and, therefore, such adaptations and modifications should and are intended to be comprehended within the meaning and range of equivalents of the disclosed embodiments. In particular, while a preferred embodiment has been described in terms of a satellite communication system, the method and apparatus of the present invention may be utilized for any distributed network that uses tables to control a coordinated, dynamic process and in which default values can be used to replace the time-varying quantities in the event of a failure.

It is to be understood that the phraseology or terminology employed herein is for the purpose of description and not of limitation. Accordingly, the invention is intended to embrace all such alternatives, modifications, equivalents and variations as fall within the spirit and broad scope of the appended claims.

What is claimed is:

1. A method for controlling operations of a communication node in a communication system having multiple nodes, the method comprising the steps of:

a) receiving a dynamic operations table which comprises timed instructions for the communication node for operations during a future predetermined period, wherein a timed instruction comprises an instruction to modify a mode of operation of the communication node, and a time of execution of the instruction;

b) storing the dynamic operations table in the communication node;

c) updating a default time which indicates a time at which the communication node must discontinue operating in accordance with the dynamic operations table and must begin operating in accordance with a default operations table, wherein the default operations table comprises a set of instructions that change the mode of operation of the communication node, and that are valid when the default time is reached, and the default time indicates a time when one or more dynamic operations tables for one or more nodes of the multiple nodes will become obsolete;

d) evaluating whether an updated default time is reached;

e) when the updated default time is not reached, operating the communication node in accordance with the dynamic operations table; and f) when the updated default time is reached, operating the communication node in accordance with the default operations table.

2. The method as claimed in claim 1 further comprising the steps of:

g) receiving a new dynamic operations table;

h) receiving an instruction to resume operations in accordance with the new dynamic operations table; and i) operating the communication node in accordance with the new dynamic operations table.

3. The method as claimed in claim 1 further comprising the steps of:

g) receiving an instruction to resume operations in accordance with the dynamic operations table; and h) operating the communication node in accordance with the dynamic operations table.

4. The method as claimed in claim 1, wherein the storing step b) comprises the step of appending the dynamic operations table to a previous dynamic operations table.

5. The method as claimed in claim 1, wherein the communication system further comprises at least one controlling center for creating dynamic operations tables for each of the multiple nodes, and the updating step c) comprises the steps of:

c1) determining, by the at least one controlling center, an earliest time when any node of the multiple nodes will reach an end of the dynamic operations tables stored within the multiple nodes;

c2) equating an exhaustion time to the earliest time;

c3) sending the exhaustion time to the multiple nodes; and c4) updating, by the multiple nodes, the default time with the exhaustion time.

6. The method as claimed in claim 1, wherein the communication system further comprises at least one controlling center, the method further comprising the steps of:

i) generating, by the at least one controlling center, a discontinue default operation message;

j) sending the discontinue default operation message to the communication node;

k) discontinuing use of the default operations table by the communication node; and l) resuming use of the dynamic operations table by the communication node.

7. The method as claimed in claim 1, wherein the communication system further comprises at least one controlling center for creating dynamic operations tables for each of the multiple nodes, and the updating step c) comprises the steps of:

c1) forecasting, by the at least one controlling center, loading times when the at least one controlling center will have completed sending future dynamic operations tables to each of the multiple nodes;

c2) determining, by the at least one controlling center, exhaustion times of the future dynamic operations tables;

c3) creating a table that correlates the loading times to the exhaustion times for the multiple nodes;

c4) sending the table to the communication node; and c5) updating the default time with an exhaustion time whenever a loading time corresponding to the exhaustion time is reached.

8. The method as claimed in claim 7, further comprising the steps of:

c6) generating, by the at least one controlling center, a backdate message that instructs the multiple nodes to backdate the default time to a previous default time when a loading operation of a particular node was unsuccessful;

c7) sending the backdate message to the communication node; and c8) updating, by the communication node, the default time with a backdated default time contained within the backdate message.

9. A method for controlling operations of a node in a communication system having multiple nodes, the method comprising the steps of:

a) operating the node according to a dynamic operations table which comprises timed instructions for the node for operations during a future predetermined period, wherein a timed instruction comprises an instruction to modify a mode of operation of the node, and a time of execution of the instruction;

b) determining an exhaustion time of the dynamic operations table as a time when a last timed instruction of the dynamic operations table is to be executed, wherein the exhaustion time indicates a time at which the node must discontinue operating in accordance with the dynamic operations table and must begin operating in accordance with a default operations table, wherein the default operations table comprises a set of instructions that change the mode of operation of the node and are valid when the exhaustion time is reached;

c) evaluating whether the exhaustion time is reached;

d) when the exhaustion time is not reached, operating the node in accordance with the dynamic operations table; and e) when the exhaustion time is reached, operating the node in accordance with the default operations table.

10. A method for controlling operations of a communication node in a communication system having at least one controlling center and multiple nodes, the method comprising the steps of:

a) generating, by the at least one controlling center a dynamic operations table for a particular node, wherein the dynamic operations table comprises timed instructions for the particular node for operating during a future predetermined period, and a timed instruction comprises an instruction to modify a mode of operation of the particular node, and a time of execution of the instruction;

b) sending the dynamic operations table to the particular node;

c) updating a default time which indicates a time at which the particular node must discontinue operating in accordance with the dynamic operations table and must begin operating in accordance with a default operations table, wherein the default operations table comprises a set of instructions that change the mode of operation, and that are valid when the default time is reached, and the default time indicates a time when one or more dynamic operations tables for one or more nodes of the multiple nodes will become obsolete; and d) sending the default time to the particular node.

11. The method as claimed in claim 10, wherein the sending step b) comprises the steps of:

b1) determining whether a line-of-sight contact with the particular node is possible;

b2) where the line-of-sight contact with the particular node is possible, sending the dynamic operations table to the particular node using a transmission medium between the particular node and the at least one controlling center; and b3) where the line-of-sight contact with the particular node is not possible, waiting to send the dynamic operations table to the particular node until the line-of-sight contact is possible.

12. The method as claimed in claim 10, wherein the sending step b) comprises the steps of:

b1) determining whether a line-of-sight contact with the particular node is possible;

b2) where the line-of-sight contact with the particular node is possible, sending the dynamic operations table to the particular node using a transmission medium between the particular node and the at least one controlling center;

b3) where the line-of-sight contact with the particular node is not possible, sending the dynamic operations table to another node with which the line-of-sight contact is possible; and b4) routing the dynamic operations table from the another node to the particular node.

13. A communication system comprising:

a) at least one controlling center for generating a dynamic operations table which comprises timed instructions for a communication node to operate during a future predetermined period, wherein a timed instruction comprises an instruction to modify a mode of operation of the communication node, and a time of execution of the instruction, the at least one controlling center for sending the dynamic operations table to the communication node; and b) at least one communication node, wherein the communication node is for receiving the dynamic operations table, conforming operations to the dynamic operations table, and updating a default time to be a time when the dynamic operations table will become exhausted and which indicates the time at which the communication node must discontinue operating in accordance with the dynamic operations table and must begin operating in accordance with a default operations table, wherein the default operations table comprises a set of instructions that change the mode of operation of the communication node, and that are valid when the default time is reached, the communication node also for evaluating whether the default time is reached, when the default time is not reached, operating the communication node in accordance with the dynamic operations table, and when the default time is reached, operating the communication node in accordance with the default operations table.

14. The communication system as claimed in claim 13, wherein the at least one controlling center additionally is for forecasting loading times when the at least one controlling center will have completed sending future dynamic operations tables to each of the at least one communication node, determining exhaustion times of the future dynamic operations tables, creating a table that correlates the loading times to the exhaustion times for the at least one communication node, and sending the table to the communication node, wherein the communication node uses the table to update the default time.

15. A communication node comprising:

a) a receiving apparatus for receiving a dynamic operations table which comprises timed instructions for the communication node for operations during a future predetermined period, wherein a timed instruction comprises an instruction to modify a mode of operation of the communication node, and a time of execution of the instruction;

b) a controller coupled to the receiving apparatus for updating a default time which indicates a time at which the communication node must discontinue operating in accordance with the dynamic operations table and must begin operating in accordance with a default operations table, wherein the default operations table comprises a set of instructions that change the mode of operation of the communication node and the default time indicates a time when one or more dynamic operations tables for one or more nodes of the multiple nodes will become obsolete, and that are valid when the default time is reached, the controller also for evaluating whether the default time is reached, when the default time is not reached, operating the communication node in accordance with the dynamic operations table, and when the default time is reached, operating the communication node in accordance with the default operations table; and c) a memory device coupled to the controller for storing the dynamic operations table and for storing the default operations table.

* * * * *